United States Patent
Park et al.

(10) Patent No.: US 7,160,828 B2
(45) Date of Patent: Jan. 9, 2007

(54) LOW-FIRE HIGH-PERMITTIVITY DIELECTRIC COMPOSITIONS

(75) Inventors: Jae-Hwan Park, Seoul (KR); Jae-Gwan Park, Seoul (KR); Dong-Soon Shin, Seoul (KR); Young-Jin Choi, Seoul (KR)

(73) Assignee: Korea Institute of Science and Technology (KR)

( * ) Notice: Subject to any disclaimer, the term of this patent is extended or adjusted under 35 U.S.C. 154(b) by 0 days.

(21) Appl. No.: 11/365,165

(22) Filed: Mar. 1, 2006

(65) Prior Publication Data

US 2006/0148637 A1 Jul. 6, 2006

Related U.S. Application Data

(62) Division of application No. 10/637,320, filed on Aug. 7, 2003, now Pat. No. 7,087,545.

(30) Foreign Application Priority Data

Apr. 2, 2003 (KR) ............................. 2003-20799

(51) Int. Cl.
*C04B 35/468* (2006.01)

(52) U.S. Cl. ..................................................... 501/139
(58) Field of Classification Search ................. 501/139
See application file for complete search history.

(56) References Cited

U.S. PATENT DOCUMENTS 6,107,228 A * 8/2000 Sugimoto et al. ........... 501/139
6,472,074 B1 * 10/2002 Sugimoto ................... 428/432

FOREIGN PATENT DOCUMENTS

DE 19749858 * 11/1997

* cited by examiner

*Primary Examiner*—Karl Group
(74) *Attorney, Agent, or Firm*—Ostrolenk, Faber, Gerb & Soffen, LLP

(57) ABSTRACT

A dielectric composition that can be fired at a temperature of below 900° C. The dielectric composition has a dielectric constant of 25–35 and a quality factor (Qxf) of 6,000–20,000 GHz. The composition comprises 3–16 wt % of $K_2O$—$Na_2O$—$Li_2O$—$B_2O_3$—$SiO_2$ system glass frit and 84–97 wt % of $BaO$—$TiO_2$ system dielectric ceramics. The composition can be effectively applied to construct a part of a ceramic multi-layer packaging as a resonator form such as a filter or an antenna, etc.

5 Claims, No Drawings

LOW-FIRE HIGH-PERMITTIVITY DIELECTRIC COMPOSITIONS

CROSS REFERENCE TO RELATED APPLICATION

This application is a divisional of U.S. application Ser. No. 10/637,320, filed Aug. 7, 2003 now U.S. Pat. No. 7,087,545 by Jae-Hwan PARK, et. al., entitled LOW-FIRE HIGH PERMITTIVITY DIELECTRIC COMPOSITIONS, which claims the benefit of Republic of Korea Appln. S.N. 20799/2003 filed on Apr. 2, 2003, the contents of which are incorporated by this reference.

BACKGROUND OF THE INVENTION

1. Field of the Invention

The present invention relates to a dielectric composition which can be fired at a temperature of below 900° C. while having a high dielectric constant and quality factor, and more particularly, to a composition with a dielectric constant in the range of 20–40 and a quality factor (Qxf) of above 10,000 GHz. This type of composition can be effectively applied to constitution of a part of a ceramic multi-layer packaging as a type of resonator such as a filter or an antenna.

2. Description of the Background Art

Development of an information and telecommunication system and related parts is largely focused on the trend of high frequency, compactness and high performance.

Especially, in order to make parts compact, a passive integration technique is required to make a passive device one module, for which many researches and development are ongoing.

Various techniques have been invented to implement a multi-layer packaging by using a ceramic material having a low dielectric loss value at a microwave band. In most cases, however, in order to fire the ceramic material, a firing process is necessarily performed at a high temperature of above 1,300° C. Thus, in order to form a conductor line inside the ceramic packaging with a multi-layer stacked structure, precious metals such as Pt or W have been used. Those precious metals, however, has problems that they are costly and have bad electrical properties because of a low electric conductivity.

Recently, a research is being actively conducted on a multi-layer ceramic packaging using the internal electrode such as Ag or Cu with an excellent electrical conductivity, instead of using the electrode such as Pt or W.

That is, a ceramic substrate with a low dielectric loss value and an AG/Cu electrode are stacked as a multi-layer and co-fired to obtain a high density three-dimensional line substrate with superior electrical properties. In such a case, in order to minimize a signal delay, preferably, the ceramic substrate has a low dielectric constant, and in order to minimize an electrical loss, the dielectric loss value is preferably small.

In addition, in order to co-fire it with the Ag electrode, the ceramic composition should have a firing temperature of below 900° C.

Relevant techniques mostly show a combination of $B_2O_3$—$SiO_2$ system glass frit and $Al_2O_3$ filler. In this case, the ceramic substrate usually has a dielectric constant in the range of 4–10.

The conventional techniques are directed to ceramic multi-layer packaging utilized only with a simple three-dimensional wiring substrate. Lately, however, as various types of passive parts are implemented inside the multi-layer ceramic packaging, advanced from the simple wiring substrate, a necessity of adding diverse functions to the packing emerges.

In particular, in order to implement a filter or an antenna in the resonator type inside the multi-layer ceramic packaging, a composition with a high dielectric constant is required. In order to control a distributed circuit element such as the filter or the antenna in the resonator type to a suitable size, a length of an effective wavelength needs to be reduced.

Currently, a microwave band is in the range of 1–300 GHz, and in this frequency range, a dielectric constant range required for obtaining a length of the most suitable effective wavelength for implementing a device is 20–100.

In addition, it is preferred that the quality factor (Qxf) has a value higher than 1,000 and a temperature coefficient of resonant frequency is below ±20 ppm/° C.

Dielectric compositions with a dielectric constant of 20–100 and excellent microwave properties are $ZrO_2$—$SnO_2$—$TiO_2$, $MgTiO_3$—$CaTiO_3$, $BaO$—$La_2O_3$—$TiO_2$, $BaO$—$TiO_2$ system.

These ceramics have a high quality factor at the microwave band (>5,000 GHz) but their firing temperature is mostly 1,300° C., high. Therefore, in order to make them a composition for packaging which can be fired together with the Ag/Cu electrode at below 900° C., a sintering additive should be added to lower the firing temperature.

U.S. Pat. No. 5,872,071 discloses lowering the sintering temperature to about 1,000° C. by adding a sintering additive in a form of $BaCuO_2$—$CuO$ in the range of 0.1–50 wt % to a $ZrO2$—$SnO_2$—$TiO_2$ composition with a dielectric constant of about 40. In this case, a dielectric constant is 35–40 and a quality factor (Qxf) is 7,000–35,000 GHz at 7 GHz.

U.S. Pat. No. 5,616,528 presents an example that up to 10 wt % of glass frit in the form of $B_2O_3$—$Li_2CO_3$ is added to a $MgTiO_3$—$CaTiO_3$ dielectric, which is then fired at a temperature of 950° C. In this case, a dielectric constant is in the range of 19–24.

U.S. Pat. No. 5,994,253 presents an example that 5–15 wt % of $ZnO$—$SiO_2$—$B_2O_3$ system glass composition is added to a $BaTiO_3$—$TiO_2$ dielectric, which is then fired at a temperature of 900–940° C. In this case, a dielectric constant is between 60 and 90 and a value 'Q' is 1,000–1,500.

The above listed patent articles present the compositions which has the dielectric constant of 20–100 and can be fired at a low temperature, but their sintering temperature is about 900–1,000° C., which is high.

Though a melting temperature of Ag is 950° C., Ag is diffused into a neighboring dielectric at above 900° C., causing problems that the electrode is changed in its form and electric conductivity is degraded.

Therefore, in order to co-fire it with the Ag electrode, the firing temperature of the ceramics is preferred to be lowered down.

SUMMARY OF THE INVENTION

Therefore, an object of the present invention is to provide a high dielectric constant ceramics of which firing temperature is below 900° C. while having favorable electrical properties.

DETAILED DESCRIPTION OF THE PREFERRED EMBODIMENTS

In order to fabricate a dielectric composition of the present invention, a high dielectric constant microwave ceramics is prepared, a glass frit composition for sintering the ceramic composition, which are then mixed and sintered at a low temperature.

First, BaO-nTiO$_2$ (n=4–4.5) composition was selected as a high dielectric composition. This composition is densificated at a temperature of above 1,350° C., and has a dielectric constant of about 38 and a quality factor (Qxf) of above 30,000 GHz.

Fabrication of Mother Material Dielectric Ceramics:

The ceramic dielectric is fabricated by the following process. Powder was fabricated by using a mixed oxide method, a general solid state reaction. As a starting material, BaCO$_3$, TiO$_2$ general ceramic material powder was calculated to have a composition of BaO-nTiO$_2$ (n=4–4.5), weighed and ball-milled.

The ball-milled mixed powder was subjected to a calcining process in the air for 2–3 hours at the temperature of 1,000–2,000° C., to synthesize a phase of BaTi$_4$O$_9$ or Ba$_2$Ti$_9$O$_{20}$.

Fabrication of Glass Frit:

A BaO—TiO$_2$ system composition glass frit for a low temperature firing was synthesized. The glass composition having a low glass transition temperature (Tg) and low dielectric loss was fabricated through repeated preliminary experiments as suggested in below Table 1.

Each material powder was weighed with the weight rate of Table 1, dry-mixed, put it in a platinum furnace, maintained at a temperature of 1,300° C. for 2 hours, and the melted material was quenched at a water tub.

The thusly obtained glass was first preliminarily broken at an agate induction and secondarily pulverized together with a zirconia ball by using ethanol as a solvent in a polyethylene bottle for 24 hours, which was then undergone an attrition milling for 5 hours.

An electrical property of the obtained glass is as shown in Table 1

TABLE 1

Lithium boroslicate glass compositions and properties

| No. | Composition (wt %) | | | | | Density (g/cm$^3$) | k (1 MHz) | tanδ (1 MHz) (%) | TEC $\alpha_{(Tg) \times 10}^{-7}$ | Tg (° C.) | Ts (° C.) |
| | Li$_2$O | B$_2$O$_3$ | SiO$_2$ | K$_2$O | Na$_2$O | | | | | | |
|---|---|---|---|---|---|---|---|---|---|---|---|
| F01 | 31.9 | 52.9 | 15.2 | — | — | 2.28 | 7.71 | 0.30 | 153 | 403 | 422 |
| F02 | 26.9 | 59.7 | 13.4 | — | — | 2.28 | 7.21 | 0.40 | 131 | 443 | 464 |
| F03 | 23.9 | 49.3 | 26.8 | — | — | 2.32 | 6.88 | 0.35 | 119 | 464 | 491 |
| F04 | 20.0 | 42.0 | 38.0 | — | — | 2.34 | 6.44 | 0.36 | 105 | 488 | 513 |
| F05 | 18.7 | 42.0 | 39.3 | — | — | 2.33 | 6.29 | 0.34 | 101 | 503 | 524 |
| F06 | 30.6 | 57.3 | 12.1 | — | — | 2.27 | 7.58 | 0.51 | 144 | 412 | 433 |
| F07 | 30.0 | 34.6 | 35.4 | — | — | 2.37 | 7.51 | 0.54 | 129 | 433 | 464 |
| F08 | 28.2 | 43.2 | 28.6 | — | — | 2.34 | 7.33 | 0.59 | 125 | 450 | 480 |
| F09 | 28.3 | 33.4 | 38.3 | — | — | 2.37 | 7.35 | 0.54 | 126 | 438 | 469 |
| F10 | 38.8 | 48.7 | 12.5 | — | — | 2.25 | 8.35 | 0.75 | 146 | 371 | 389 |
| F11 | 40.3 | 50.3 | 9.4 | — | — | 2.23 | 8.47 | 0.46 | 150 | 359 | 377 |
| F12 | 36.6 | 56.3 | 7.1 | — | — | 2.23 | 8.15 | 0.80 | 146 | 379 | 398 |
| F13 | 15.3 | 47.9 | 10.1 | 16.1 | 10.6 | 2.32 | 8.44 | 0.70 | 150 | 400 | 421 |
| F14 | 21.6 | 50.7 | 10.7 | 17.0 | — | 2.31 | 8.11 | 0.60 | 142 | 402 | 423 |
| F15 | 23.0 | 53.8 | 11.3 | — | 11.9 | 2.28 | 7.91 | 0.56 | 137 | 410 | 433 |
| F16 | 14.3 | 28.2 | 32.4 | 15.1 | 10.0 | 2.45 | 8.14 | 0.67 | 146 | 426 | 460 |
| F17 | 20.0 | 29.8 | 34.2 | 16.0 | — | 2.41 | 7.83 | 0.89 | 139 | 432 | 467 |
| F18 | 21.4 | 31.4 | 36.1 | — | 11.1 | 2.39 | 7.65 | 0.90 | 137 | 423 | 452 |
| F19 | 19.2 | 39.9 | 7.4 | 20.2 | 13.3 | 2.30 | 9.51 | 0.94 | 175 | 348 | 365 |
| F20 | 27.5 | 42.8 | 8.0 | 21.7 | — | 2.28 | 9.11 | 0.89 | 165 | 348 | 365 |
| F21 | 29.7 | 46.3 | 8.6 | — | 15.4 | 2.24 | 8.87 | 0.67 | 159 | 349 | 365 |

In the present invention, besides the BaO-nTiO$_2$ (n=4–4.5), other types of compositions similar to the BaO-nTiO$_2$ were considered. That is, as a dielectric composition with a dielectric constant of 80–90, a composition of (Ba, Pb)O—Nd$_2$O$_3$—TiO$_2$(BaO:PbO:Nd$_2$O$_3$:TiO$_2$=8.3:36.4: 12.1:43.2 wt %) and a composition of Bao-(Bi,Nd)$_2$O$_3$—TiO$_2$(BaO:Bi$_2$O$_3$:Nd$_2$O$_3$:TiO$_2$=16.4:9.9:35.1:38.6 wt %) were considered for their low temperature sintering characteristics by a glass frit.

Its Fabrication Method is as Follows.

Powder was prepared by using a mixed oxide method, a general solid state reaction.

First, BaCO$_3$, PbO, Bi$_2$O$_3$, Nd$_2$O$_3$, TiO$_2$ general ceramic material powder was weighed down to four decimal places of effective numbers at a quantizing rate to make a composition, respectively, and ball-milled by using deionized water. The ball-milled mixed powder is calcined in the air for 2–3 hours at a temperature of 1,000–1,200° C. at a rising temperature rate of 300° C./h, to synthesize each phase.

Property of glass frit:

Physical and electrical properties of the glass frit can be known from the results of Table 1.

An extensive inspection on Li$_2$O—B$_2$O$_3$—SiO$_2$ three component system shows that a composition in the range of F01–F12 was evaluated to have a low glass transition temperature (Tg) and excellent electrical property.

In view of composition, SiO$_2$ was set in the range of 7–40 wt %, B$_2$O$_3$ was set in the range of 33–60 wt %, and Li$_2$O was set in the range of 18–41%.

As a whole, a density in the range of 2.2–2.5 was obtained and dielectric constant (k) was shown in the range of 6.4–8.5. A glass transition temperature (Tg) was shown in the range of 350° C.–510° C., and a dielectric loss (tan δ) was shown in the range of 0.3–1.0%.

In case of F13–F21, compositions in which a part of Li$_2$O is substituted with K$_2$O and Na$_2$O, it is noted that a dielectric loss value was somewhat increased but the glass transition temperature was substantially low.

A thermal expansion coefficient (TEC) was shown in the range of $100$–$170 \times 10^{-6}$, which is more increased in case of the composition that a part of $Li_2O$ is substituted with $K_2O$ and $Na_2O$.

Mixture of dielectric powder and glass frit:

A glass frit having such various types of composition as fabricated in the above method was mixed with a BaO—$TiO_2$ system dielectric composition (BaO—$4TiO_2$:BT4) in an addition range of 3–15 wt % as shown in Table 2.

The dielectric and glass frit was, respectively, wet-mixed together with a zirconia ball by using ethanol as a solvent for 24 hours.

In order to shape the mixed powder, 2 wt % of PVA (poly-vinyl alcohol) aqueous solution was added as a binding agent and agglomerated through sieving (100 mesh). The finally obtained composite material was unixially pressurized in a mold with a diameter of 10 mm under the pressure of 1,000 $kg/cm^3$, in order to make it in a cylindrical shape.

The shaped test sample was heated at a rising temperature rate of 5° C./min, sintered at a temperature of 800–950° C., and then furnace-cooled. Table 2 shows sintering and electric properties of the thusly obtained test sample.

TABLE 2

| No. | Ceramic composition Type | Content (wt %) | Glass composition Type | Content (wt %) | Firing temperature (° C.) | Relative density (%) | Dielectric constant (k) | Quality factor (GHz) | $\tau_f$ (ppm/° C.) |
|---|---|---|---|---|---|---|---|---|---|
| D01 | BT4 | 95 | F01 | 5 | 925 | 98.82 | 34.7 | 11200 | +19 |
| D02 | BT4 | 93 | | 7 | 875 | 99.78 | 33.8 | 12700 | +25 |
| D03 | BT4 | 90 | | 10 | 875 | 99.45 | 31.2 | 9600 | +15 |
| D04 | BT4 | 95 | F05 | 5 | 950 | 96.73 | 32.4 | 11700 | +10.6 |
| D05 | BT4 | 93 | | 7 | 925 | 97.68 | 31.4 | 9500 | +31.5 |
| D06 | BT4 | 90 | | 10 | 900 | 98.88 | 30.1 | 9200 | +30.8 |
| D07 | BT4 | 97 | F06 | 3 | 950 | 98.71 | 36.6 | 20600 | +10 |
| D08 | BT4 | 95 | | 5 | 925 | 98.31 | 34.5 | 13200 | +29 |
| D09 | BT4 | 93 | | 7 | 900 | 99.01 | 33.3 | 9900 | +26 |
| D10 | BT4 | 90 | | 10 | 875 | 98.22 | 31.7 | 9000 | +11 |
| D11 | BT4 | 87 | | 13 | 875 | 96.16 | 27.9 | 7000 | +5 |
| D12 | BT4 | 84 | | 16 | 875 | 99.17 | 27.0 | 6100 | +2 |
| D13 | BT4 | 95 | F08 | 5 | 925 | 98.66 | 34.5 | 11300 | +11 |
| D14 | BT4 | 93 | | 7 | 900 | 98.01 | 32.5 | 9900 | +17 |
| D15 | BT4 | 90 | | 10 | 875 | 99.24 | 30.6 | 6500 | +24 |
| D16 | BT4 | 95 | F09 | 5 | 950 | 95.07 | 32.3 | 12200 | +8 |
| D17 | BT4 | 93 | | 7 | 875 | 92.91 | 29.5 | 9400 | +22 |
| D18 | BT4 | 90 | | 10 | 875 | 94.40 | 29.0 | 6200 | +25 |
| D19 | BT4 | 95 | F10 | 5 | 925 | 98.05 | 32.8 | 18600 | +18 |
| D20 | BT4 | 93 | | 7 | 925 | 99.99 | 32.7 | 16900 | +24 |
| D21 | BT4 | 90 | | 10 | 925 | 99.99 | 30.4 | 11900 | +21 |
| D22 | BT4 | 95 | F13 | 5 | 925 | 99.99 | 36.6 | 11600 | +29 |
| D23 | BT4 | 93 | | 7 | 900 | 99.99 | 34.4 | 15000 | +22 |
| D24 | BT4 | 90 | | 10 | 875 | 99.99 | 30.9 | 11600 | +18 |
| D25 | BT4 | 95 | F14 | 5 | 925 | 99.99 | 36.0 | 11000 | +3 |
| D26 | BT4 | 93 | | 7 | 900 | 99.99 | 33.2 | 13300 | +7 |
| D27 | BT4 | 90 | | 10 | 875 | 98.24 | 29.2 | 10500 | −11 |
| D28 | BT4 | 95 | F16 | 5 | 925 | 99.99 | 36.6 | 11800 | +34 |
| D29 | BT4 | 93 | | 7 | 900 | 99.99 | 34.2 | 9600 | +19 |
| D30 | BT4 | 90 | | 10 | 875 | 99.81 | 30.2 | 9500 | +3 |

Characteristics of Dielectric/Glass Frit Mixture:

Table 2 shows a density and an electrical property of the test sample which was obtained by adding 3–14 wt % of various types of glass frits to the BaO—$4TiO_2$ ($BaTi_4O_9$) composition and sintering it at the temperature of 850–950° C.

On the whole, an excellent low-temperature sintering property is shown having a relative density of above 99% at a temperature of below 900° C. Especially, F01, F08, F13 and F16 shows a density of above 99% at a temperature of 875° C. when 10% of frit is added.

Observation through a scanning electron microscope confirms that a dense structure without an air pore was obtained.

Substantially, a dielectric constant was shown in the range of 25–37, and a quality factor was about 5,000–20,000 GHz.

When conditions are limited to a density of above 99% at a firing temperature of below 875° C. most suitable for co-firing together with Ag electrode, when glass frits such as F08, F13 or the like was added in the range of 7–10 wt %, a quality factor was obtained by above 10,000 and a dielectric constant was obtained by more than 30.

Inspection on the BaO-4.5$TiO_2$ ($Ba_2Ti_9O_{20}$) composition shows that it also has the similar low temperature sintering property and electrical property when the glass frit was added thereto.

Those composition as described above are suitable for use as a material for ceramic multi-layer package in the type of resonator co-filed with Ag electrode.

Comprehensively speaking on the basis of Table 1 and Table 2, it is noted that, for $Li_2O$—$B_2O_3$—$SiO_2$ system, the case of substitution of $Li_2O$ with $K_2O$ and $Na_2O$ shows a better low-temperature sintering property while its quality factor was a bit degraded.

Results on Another Type of Dielectric Composition:

Besides the BaO-n$TiO_2$ (n=4–4.5) composition primarily discussed in the present invention, Table 3 shows results of different types of compositions, that is, (Ba,Pb)O—$Nd_2O_3$—$TiO_2$ (BPNT) composition and BaO—$(Bi,Nd)_2O_3$—$TiO_2$ (BBNT) composition. When F08 and F16 frits was applied, a composition having a density of above 98% at a temperature of 875° C. was obtained. In such a case, its dielectric constant was 40–65 and a quality factor was 1,000–3,000.

TABLE 3

| No. | Ceramic composition Type | Ceramic composition Content (wt %) | Glass composition Type | Glass composition Content (wt %) | Firing temperure (° C.) | Relative density (%) | Dielectric constant (k) | Quality factor (GHz) | $\tau_f$ (ppm/° C.) |
|---|---|---|---|---|---|---|---|---|---|
| E01 | BPNT | 85 | F01 | 15 | 875 | 97.32 | 51.1 | 2700 | +23 |
| E02 | BPNT | 85 | F04 | 15 | 875 | 97.88 | 50.5 | 2500 | +17 |
| E03 | BPNT | 80 |     | 20 | 875 | 97.05 | 39.4 | 2500 | +19 |
| E04 | BPNT | 85 | F08 | 15 | 875 | 99.17 | 50.8 | 2700 | +33 |
| E05 | BPNT | 80 |     | 20 | 875 | 99.99 | 43.3 | 2600 | +11 |
| E06 | BPNT | 85 | F14 | 15 | 875 | 90.68 | 40.6 | 850  | +17 |
| E07 | BPNT | 80 |     | 20 | 875 | 94.43 | 34.8 | 2400 | +17 |
| E08 | BBNT | 93 | F16 | 7  | 850 | 94.18 | 59.3 | 1500 | −17 |
| E09 | BBNT | 93 |     | 7  | 875 | 98.21 | 64.3 | 2700 | +26 |
| E10 | BBNT | 93 |     | 7  | 900 | 99.47 | 66.4 | 2700 | +37 |
| E11 | BBNT | 90 |     | 10 | 825 | 95.96 | 52.1 | 1900 | +6 |
| E12 | BBNT | 90 |     | 10 | 850 | 97.46 | 53.3 | 2400 | +15 |
| E13 | BBNT | 90 |     | 10 | 875 | 98.41 | 55.3 | 2500 | +21 |
| E14 | BBNT | 90 |     | 10 | 900 | 99.59 | 56.7 | 2700 | +31 |
| E15 | BBNT | 87 |     | 13 | 825 | 95.25 | 44.5 | 1300 | −17 |
| E16 | BBNT | 87 |     | 13 | 850 | 95.52 | 45.2 | 2400 | +20 |
| E17 | BBNT | 87 |     | 13 | 875 | 96.78 | 46.3 | 2400 | +4 |
| E18 | BBNT | 87 |     | 13 | 900 | 97.98 | 47.0 | 2600 | +24 |

As so far described, by mixing 3–16 wt % of $K_2O$—$Na_2O$—$Li_2O$—$B_2O_3$—$SiO_2$ system glass frit and 84–97 wt % of $BaO$—$TiO_2$ system dielectric ceramics, a dielectric composition was obtained which can be fired at a temperature of below 875° C.

The dielectric composition has a dielectric constant of 25–35 and a quality factor (Qxf) of 6,000–20,000 GHz.

The composition according to the present invention can be effectively applied to construct a part of a ceramic multi-layer packaging as a resonator form such as a filter or an antenna, etc.

Especially, the composition of the present invention can be fired at a temperature of below 875° C., considerably low than the melting temperature of Ag electrode, 950° C., for less than 2 hours. Thus, during the firing process, a diffuse reaction of the Ag electrode is restrained so that reactivity with the electrode can be minimized.

What is claimed is:

1. A dielectric composition comprising:
   84–97 wt % of $(Ba,Pb)Nd_2O_3$—$TiO_2$; and
   3–16 wt % of glass frit containing $Li_2O$, $B_2O_3$ and $SiO_2$, wherein the glass frit comprises: 7–40 wt % of $SiO_2$, 33–60 wt % of $B_2O_3$, and 18–41 wt % of $Li_2O$.

2. The composition of claim 1, wherein $Li_2O$ is substituted by 0–50% with $K_2O$ and $Na_2O$ in each weight ratio.

3. The composition of claim 1, wherein the glass frit has a dielectric constant of 6.4–8.5, a glass transition temperature of 350–510° C. and a dielectric loss value of 0.3–1.0%.

4. The composition of claim 2, wherein the glass frit has a dielectric constant of 6.4–8.5, a glass transition temperature of 350–510° C. and a dielectric loss value of 0.3–1.0%.

5. The composition of claim 1, which has a density of above 99% at a temperature of below 875° C., a dielectric constant of 25–35, and a quality factor (Qxf) of 6,000–20,000.

* * * * *